US010009744B2

(12) United States Patent
Wang et al.

(10) Patent No.: US 10,009,744 B2
(45) Date of Patent: Jun. 26, 2018

(54) THROTTLING OF RADIO RESOURCE CONTROL CONNECTION REQUESTS (71) Applicant: Verizon Patent and Licensing Inc., Arlington, VA (US)

(72) Inventors: Xin Wang, Morris Plains, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 15/016,317

(22) Filed: Feb. 5, 2016

(65) Prior Publication Data
US 2017/0230779 A1 Aug. 10, 2017

(51) Int. Cl.
*H04W 4/70* (2018.01)
*H04W 4/00* (2018.01)
*H04W 72/04* (2009.01)
*H04W 28/02* (2009.01)

(52) U.S. Cl.
CPC ............ *H04W 4/70* (2018.02); *H04W 4/005* (2013.01); *H04W 28/0257* (2013.01); *H04W 72/048* (2013.01); *H04W 72/0413* (2013.01)

(58) Field of Classification Search
CPC ..... H04W 4/70; H04W 4/005; H04W 72/048; H04W 72/0413; H04W 28/0257
See application file for complete search history.

(56) References Cited

U.S. PATENT DOCUMENTS

| | | | |
|---|---|---|---|
| 9,414,298 B1* | 8/2016 | Pasupuleti | H04W 48/02 |
| 9,485,712 B1* | 11/2016 | Hoffner | H04W 8/08 |
| 2012/0002614 A1* | 1/2012 | Ekici | H04W 48/18 370/329 |
| 2013/0023260 A1* | 1/2013 | Shu | H04W 36/28 455/418 |
| 2013/0331137 A1* | 12/2013 | Burchill | H04W 52/243 455/501 |
| 2014/0038588 A1* | 2/2014 | Ljung | H04W 52/0216 455/422.1 |
| 2014/0056132 A1* | 2/2014 | Lim | H04W 28/0284 370/230 |
| 2014/0148122 A1* | 5/2014 | Meredith | H04W 28/0226 455/405 |
| 2014/0219184 A1* | 8/2014 | Makharia | H04W 28/18 370/329 |
| 2014/0334309 A1* | 11/2014 | Mihaly | H04L 47/2441 370/235 |

(Continued)

*Primary Examiner* — Ajay Cattungal (57) ABSTRACT

A method, a device, and a non-transitory storage medium provide for storing parameters of a throttling service that governs transmissions of radio resource connection requests to a wireless network; generating a first radio resource connection request that includes an establishment cause; determining whether the establishment cause is subject to the throttling service; determining a value of a first parameter of the parameters in response to determining that the establishment cause is subject to the throttling service; omitting to transmit the first radio resource connection request in response to determining that the value of the first parameter is a first value; and transmitting the first radio resource connection request to the wireless network in response to determining that the value of the first parameter is a second value, wherein the first value and the second value are different.

20 Claims, 5 Drawing Sheets

(56) References Cited

U.S. PATENT DOCUMENTS

| | | | | |
|---|---|---|---|---|
| 2014/0347983 A1* | 11/2014 | Griot | ............... | H04W 28/0289 370/230 |
| 2016/0014154 A1* | 1/2016 | Huang | ............... | H04L 63/20 726/1 |
| 2016/0044530 A1* | 2/2016 | Cheng | ............... | H04W 28/0289 370/235 |
| 2016/0072898 A1* | 3/2016 | Fallon | ............... | H04L 47/22 455/414.1 |
| 2016/0135114 A1* | 5/2016 | Hsu | ............... | H04W 48/06 370/252 |
| 2016/0183260 A1* | 6/2016 | Sriram | ............... | H04W 72/048 370/329 |

\* cited by examiner

THROTTLING OF RADIO RESOURCE CONTROL CONNECTION REQUESTS

BACKGROUND

In a Long Term Evolution (LTE) network, wireless devices transmit radio resource control (RRC) connection requests to gain access to and use of the LTE network. Typically, machine-to-machine (M2M) communications or machine-type communication (MTC) communications have the characteristics of small data demand and infrequent network access.

DETAILED DESCRIPTION OF PREFERRED EMBODIMENTS

The following detailed description refers to the accompanying drawings. The same reference numbers in different drawings may identify the same or similar elements. In addition, the following detailed description does not limit the invention.

In various Third Generation Partnership Project (3GPP) specifications (e.g., 3GPP technical specification (TS) 36.331, version 13.0.0, etc.), an RRC Connection request is treated differently depending on an establishment cause associated with the RRC Connection request. For example, the establishment cause may include delayTolerantAccess, mo-Data, emergency, highPriorityAccess, mt-Access, or mo-Signaling. The establishment cause provides a general indication of the nature of the RRC Connection request. While in an LTE network and other types of wireless networks, the RRC Connection request may be handled during an RRC Connection Establishment procedure based on the establishment cause, there are other factors to be considered that may have some significance, such as a service level agreement (SLA) that governs the wireless service being provided. For example, machine-type devices (MTDs) (e.g., meters, sensors, Internet of Things (IoT) devices, etc.) may not always operate in accordance with the service level agreement. By way of further example, machine-type devices may transmit a number of RRC Connection requests, which exceeds the number of RRC Connection requests permitted within a certain time period specified in the service level agreement. With cost and efficient use of network resources in mind, among other considerations, prevention of excessive RRC Connection requests from end devices relative to the service level agreement should be addressed.

According to an exemplary embodiment, a throttling service is described in which parameters are used by an end device to govern RRC Connection requests transmitted by the end device. According to an exemplary embodiment, the parameters are stored at the end device and govern the number of RRC Connection requests that can be transmitted over a time period. The parameters may be specified in a service level agreement based on the type of end device and/or the type or level of wireless service. According to an exemplary embodiment, the end device includes a throttling agent that provides the throttling service.

According to an exemplary implementation, the parameters include an RRC Connection Interval parameter and an RRC Connection Burst parameter. The RRC Connection Interval parameter indicates an average number of RRC Connection requests that an end device can transmit during an interval of time. As an example, the service level agreement may specify that no more than one RRC Connection request be transmitted within a fifteen minute time period. According to this example, the end device may transmit a first RRC Connection request after ten minutes expire and then transmit a second RRC Connection request after twenty minutes expire since the number of requests over the thirty minutes time period satisfies the one RRC Connection request per fifteen minutes parameter. Alternatively, the end device may transmit a different time-based series of RRC Connection requests that adhere to the RRC Connection Interval parameter. Stated differently, the RRC Connection Interval parameter indicates an average interval between RRC Connection requests and reflects how often the end device can transmit an RRC Connection request.

According to an exemplary implementation, the RRC Connection Burst parameter indicates a maximum number of RRC Connection requests that an end device can transmit during the interval of time. As an example, the service level agreement may specify that no more than four RRC Connection requests be transmitted within a fifteen minute time period. Also, assume that the RRC Connection Interval parameter indicates an average of one RRC Connection request/fifteen minutes. According to an exemplary scenario, assume that end device does not transmit any RRC Connection requests for six hours. Subsequently, the end device wishes to transmit a series of RRC Connection request. While according to the RRC Connection Interval parameter, the end device may be entitled to transmit twenty-four RRC Connection requests, the RRC Connection Burst parameter limits the number to four RRC Connection requests during the fifteen minutes subsequent to the six hours.

According to an exemplary embodiment, the throttling service is enabled or disabled based on the value of the RRC Connection Interval parameter. According to an exemplary embodiment, when the throttling service is enabled, the end device uses a value of an RRC Connection Token Bucket parameter to determine whether an RRC Connection request can be transmitted or throttled (e.g., not transmitted).

Figure 1:
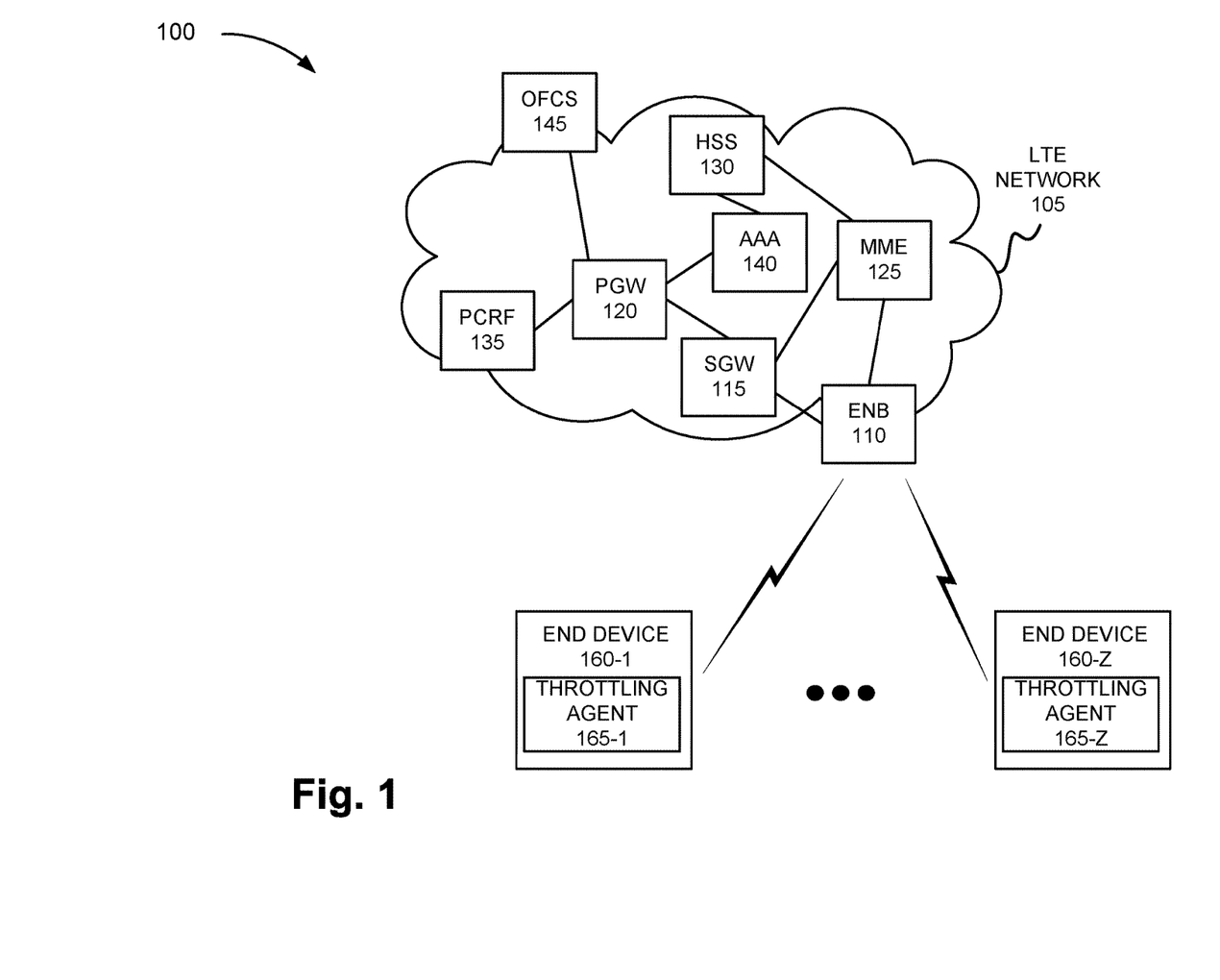
FIG. 1 is a diagram illustrating an exemplary environment in which an exemplary embodiment of a throttling service may be implemented.

FIG. 1 is a diagram illustrating an exemplary environment 100 in which an exemplary embodiment of a throttling service may be implemented. As illustrated, environment 100 includes an LTE network 105 that includes an evolved Node B (eNB) 110, a serving gateway (SGW) 115, a PGW 120, an MME 125, an HSS 130, and a policy charging and rules function (PCRF) 135. Additionally, environment 100 includes an authentication, authorization, and accounting (AAA) server 140, an offline charging system (OFCS) 145, and end devices 160-1 through 160-Z (also referred to collectively as end devices 160 and, individually and generically as end device 160).

Environment 100 is implemented to include wireless connections between end devices 160 and LTE network 105. The wireless connection between end device 160 and LTE network 105 may be direct or indirect and may involve an intermediary device not illustrated in FIG. 1. For example, environment 100 may include a femto device, a pico device, a home eNB, or other type of wireless station (e.g., a relay device, etc.). Additionally, or alternatively, the wireless connection may involve an intermediary network not illustrated in FIG. 1. The number and the arrangement of connections between the devices are exemplary. The number of devices, the number of networks, and the configuration in environment 100 are exemplary. According to other embodiments, environment 100 may include additional devices, fewer devices, and/or differently arranged devices, than those illustrated in FIG. 1.

Additionally, LTE network 105 is intended to illustrate an exemplary wireless network. According to other embodiments, environment 100 may include another type of wireless network, in addition to or instead of LTE network 105. For example, the wireless network may be implemented as an LTE-Advanced (LTE-A) network, a UMTS Terrestrial Radio Access Network (U-TRAN) network, a Universal Mobile Telecommunications System (UMTS) network, a Global System for Mobile Communications (GSM) network, a Wideband Code Division Multiple Access (WCDMA) RAN, an Ultra Mobile Broadband (UMB) network, a High-Speed Packet Access (HSPA) network, an Evolution Data Optimized (EV-DO) network, a LoRa Wide Area Network (WAN) network, and so forth.

LTE network 105 includes a network defined by a Third Generation Partnership Project (3GPP) specification or LTE architecture. ENB 110, SGW 115, PGW 120, MME 125, and PCRF 135 may each operate according to an LTE specification and architecture. HSS 130 includes a device that stores subscription or profile data. AAA 140 includes a device that provides authentication, authorization, and accounting services. OFCS 145 includes a device that provides an off-line charging service that includes the generation of charging data records (CDRs) for the billing system.

End device 160 includes a device that has computational and wireless communicative capabilities. End device 160 may be implemented as a mobile device, a portable device, or a stationary device. According to an exemplary embodiment, end device 160 is a machine-type device that supports one or multiple types of communication. For example, the type of communication includes machine-to-machine (M2M) communication, machine-type communication (MTC), device-to-device (D2D) communication, Internet of Things (IoT) communication, or telemetric communication. Examples of end device 160 include a meter device associated with providing a utility service (e.g., gas, electric, etc.), a smart device (e.g., a sensor device, a home security system, a healthcare device, etc.), or other type of device pertaining to transportation, retail, logistics, and so forth. According to other embodiments, end device 160 may be implemented as a smartphone, a personal digital assistant, a tablet, a netbook, a phablet, an infotainment system in a vehicle, or a wearable device (e.g., a watch, glasses, etc.). Alternatively, for example, end device 160 may be implemented as a kiosk, a point of sale terminal, a vending machine, a set top box, and so forth.

As illustrated in FIG. 1, end devices 160-1 through 160-Z each include a throttling agent 165-1 through 165-Z (also referred to collectively as throttling agents 165 and, individually and generically as throttling agent 165). Throttling agent 165 includes logic to provide the throttling service, as described herein. According to an exemplary embodiment, the throttling service applies to RRC Connection requests having an establishment cause set to a particular value. According to an exemplary implementation, the throttling service applies to RRC Connection requests having an establishment cause value indicating delayTolerantAccess or mo-Data. According to other exemplary implementations, the throttling service applies to a different set of establishment cause values. For example, RRC Connection requests having an establishment cause value set to mt-Access or mo-Signaling may be subject to the throttling service, as well as other establishment cause values not specifically mentioned herein. Of course, due to the nature of the throttling service, establishment cause values indicating emergency or highPriorityAccess may not be subject to the throttling service. Nevertheless, the establishment cause(s) subject to the throttling service is a configurable parameter. For example, an administrator of the wireless network and/or end device 160 may configure this parameter. Additionally, this parameter may be updated and does not necessarily have to be a static parameter. For example, this parameter may be updated in response to wireless network-side conditions (e.g., congestion, etc.) and so forth.

According to an exemplary embodiment, throttling agent 165 uses configurable parameters stored at end device 160 that are used to provide the throttling service. According to an exemplary implementation, the parameters include an RRC Connection Interval parameter and an RRC Connection Burst parameter. According to other exemplary implementations, the throttling service may use additional, fewer, and/or different parameters to govern the number of RRC Connection requests during a time period.

The RRC Connection Interval parameter indicates an average RRC Connection interval that end device 160 can transmit an RRC Connection request. According to an exemplary implementation, the RRC Connection Interval parameter includes a time value and a time unit of measurement. For example, the value may range from 0 to 2,592,000 and the time unit of measurement may be in seconds. According to other exemplary implementations, the time value range and/or the time unit of measurement may be different. For example, the time value range may be narrower or larger than 0 to 2,592,000. Additionally, or alternatively, for example, the time unit of measurement may be in terms of milliseconds, minutes, hours, or other increment of time. According to an exemplary implementation, the RRC Connection Interval parameter includes a value indicating a number of RRC Connection requests. For example, the value may be 1.

According to an exemplary implementation, the RRC Connection Interval parameter has a default value. For example, the default value may be 1/900 seconds (i.e. one RRC Connection request/15 minutes). According to other exemplary implementations, the default value may be different. According to an exemplary implementation, when the RRC Connection Interval parameter is set at particular value (e.g., 0), the throttling service of throttling agent 165 is disabled. Otherwise, for any other value, the throttling service is enabled.

The RRC Connection Burst parameter indicates a maximum number of RRC Connection requests that end device 160 can transmit during an interval of time. According to an exemplary implementation, the RRC Connection Burst parameter includes a value indicating a number of RRC Connection requests. For example, the value may range from 1 to 100. According to other exemplary implementations, the value range may be different. According to an exemplary implementation, the RRC Connection Burst parameter includes a time value and a time unit of measurement. The time value and time unit of measurement may be shorter than that of the RRC Connection Interval parameter. According to an exemplary implementation, the RRC Connection Burst parameter has a default value. For example, the default value may be 4. According to other exemplary implementations, the default value may be smaller or larger than 4.

According to an exemplary embodiment, parameters used by throttling agent 165 can be updated. According to an exemplary implementation, the parameters can be updated through over-the-air device management or other conventional means (e.g., a user operating end device 160, etc.). However, a service provider of the throttling service, which may also be the service provider of the wireless network service, may or may not elect to restrict updating and/or configuring of the throttling service of end device 160.

According to an exemplary embodiment, throttling agent 165 uses a token bucket parameter to determine whether an RRC Connection request can be transmitted or not. According to an exemplary implementation, the token bucket parameter has a value from 0 to the value of the RRC Connection Burst parameter.

Figure 2:
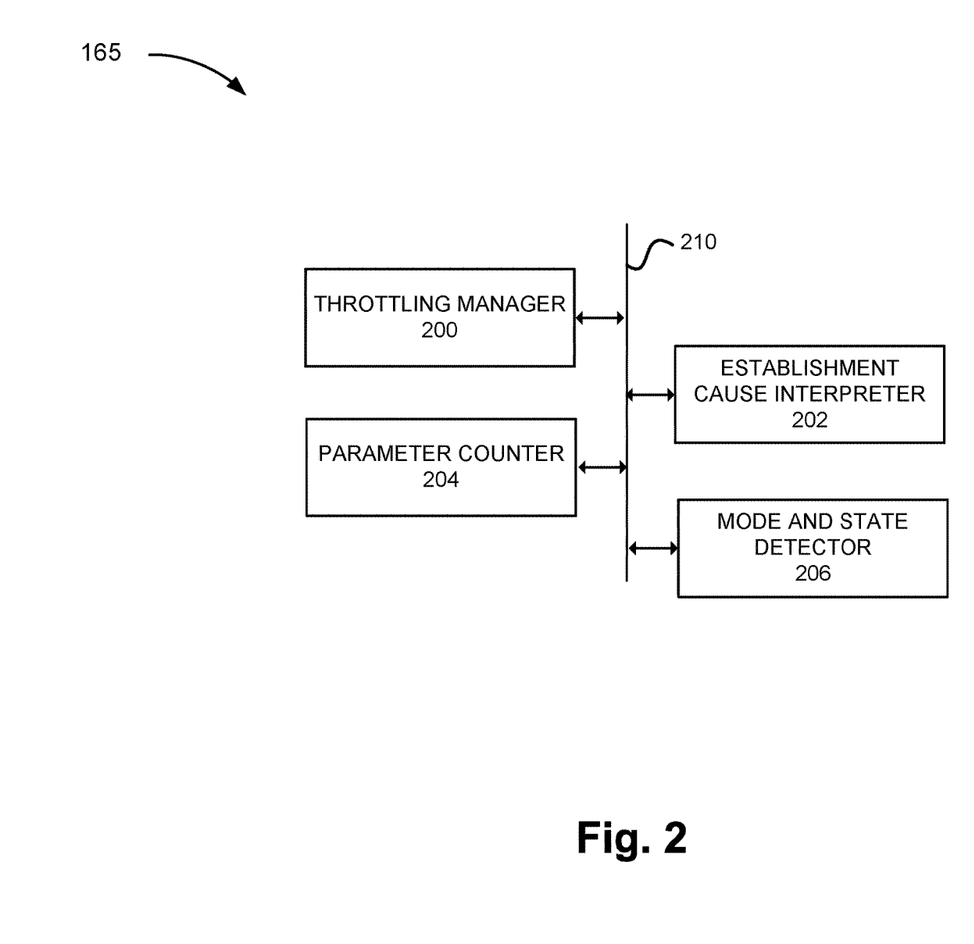
FIG. 2 is a diagram illustrating exemplary functional components of a targeting agent.

FIG. 2 is a diagram illustrating exemplary functional components of throttling agent 165. Referring to FIG. 2, throttling agent 165 includes a throttling manager 200, an establishment cause interpreter 202, a parameter counter 204, and a mode and state detector 206. According to other exemplary embodiments, throttling agent 165 may include additional, fewer, and/or different functional components than those illustrated in FIG. 2 and described herein. For example, according to other exemplary embodiments, throttling agent 165 may not include mode and state detector 206. Additionally, or alternatively, multiple functional components of throttling agent 165 may be combined into a single functional component and/or a single functional component may be implemented as multiple functional components in which a process or a function may be collaboratively performed or multiple processes or functions may be split between them. Throttling manager 200, establishment cause interpreter 202, parameter counter 204, and mode and state detector 206 may be connected to and communicate with each other via a link 210. Link 210 may be implemented as a hardware link (e.g., a bus, a shared memory space, etc.) or a software link (e.g., inter-process communication (IPC), etc.).

Throttling manager 200 includes logic that manages the storing and the updating of the parameters used to provide the throttling service. For example, throttling manager 200 stores the RRC Connection Interval parameter, the RRC Connection Burst parameter, and the token bucket parameter. According to an exemplary implementation, the parameters are stored in non-volatile memory at end device 160. Throttling manager 200 also updates the values of the parameters in response to device commands. According to an exemplary implementation, throttling manager 200 includes an over-the-air device management client that includes logic to receive and execute a command to update the value of a parameter. The over-the-air device management client may include logic to receive and execute other types of commands pertaining to device management, generate and transmit a message, and so forth. According to other exemplary implementations, throttling manager 200 may include graphical user interfaces to allow a user to update and/or configure settings of the throttling service. Throttling manager 200 includes logic to determine whether the throttling service is enabled or disabled based on the value of the RRC Connection Interval parameter. For example, when the RRC Connection Interval parameter is set at a particular value (e.g., a value of 0), the throttling service of throttling agent 165 is disabled; otherwise the throttling service is enabled.

Establishment cause interpreter 202 includes logic that reads establishment causes associated with RRC Connection requests generated at end device 160. Establishment cause interpreter 202 determines whether the establishment cause is set to a value for which the RRC Connection request is subject to the throttling service. According exemplary implementations, the establishment cause values of delay-TolerantAccess and mo-Data are subject to the throttling service. According to other exemplary implementations, additional, fewer, and/or different establishment causes may be subject to the throttling service.

Parameter counter 204 includes logic that increments and decrements the value of the token bucket parameter. According to an exemplary embodiment, when end device 160 is powered on, throttling manager 200 initializes the value of the token bucket parameter. For example, the value of the token bucket parameter may be initialized to a value of 1. Thereafter, parameter counter 204 includes logic to increment the value of the token bucket parameter by 1 for every interval of the RRC Connection Interval parameter that lapses. For example, when the RRC Connection Interval parameter indicates 1 RRC Connection request/15 minutes, parameter counter 204 increments the value of the token bucket parameter by 1 after each fifteen minutes of time. When the value of the token bucket parameter reaches the value of the RRC Connection Burst parameter, parameter counter 204 no longer increments the value of the token bucket parameter. That is, the value of the token bucket parameter is capped.

Parameter counter 204 decrements the value of the token bucket parameter for each successful RRC Connection request that has the establishment cause set to a particular value (or set of values) (e.g., delayTolerantAccess, mo-Data, etc.). Parameter counter 204 determines whether an RRC Connection request is successful based on a message received or not received by end device 160 subsequent to and responsive to the transmission of the RRC Connection request. For example, when end device 160 does not receive an RRC Connection Setup message or receives an RRC Connection Reject message from LTE network 105 (e.g., eNB 110), parameter counter 204 determines that the RRC Connection request is unsuccessful and does not decrement the value of the token bucket parameter. Alternatively, for example, when end device 160 receives an RRC Connection Setup, parameter counter 204 determines that the RRC Connection request is successful and decrements the value of the token bucket parameter. According to wireless networks other than LTE, the message received or the absence of the message received may be different. Additionally, for example, other messages pertaining to LTE may be considered, such as those exchanged during an RRC Connection Re-establishment procedure (e.g., an RRC Connection re-establishment request, an RRC Connection re-establishment, an RRC Connection re-establishment reject, etc.).

Mode and state detector 206 includes logic to identify a state and/or a mode in which end device 160 is operating. For purposes of description, the term "state" means the state of end device 160 relative to the wireless network and the wireless standard. According to an exemplary implementation in relation to an LTE context, mode and state detector 206 obtains state information from LTE UE control plane modules (e.g., NAS, RRC, PHY, and/or RF). For example, according to an LTE specification with respect to the RRC layer, end device 160 may be in an RRC connected state or an RRC idle state. Additionally, or alternatively, for example, with respect to the non-access stratum layer, end device 160 may be in various Evolved Packet System (EPS) EPS Session Management (ESM), EPS Mobility Management (EMM), and EPS Connection Management (ECM) states (e.g., EMM-Registered, ECM-idle, etc.). End device 160 may be in a particular state and transitions between states. Mode and state detector 206 may store the state information indicating the state of end device 160 in a data structure or in another suitable form. For example, the state information may be stored in non-volatile memory. Mode and state detector 206 may also store corresponding time information indicating the period of time end device 160 was in the particular state. Mode and state detector 206 obtains state information of end device 160 when the throttling service is enabled (e.g., when end device 160 is powered on).

Additionally, or alternatively, mode and state detector 206 includes logic to identify the mode of end device 160. For purposes of description, the term "mode" means the mode of end device 160 relative to its operating system. For example, mode and state detector 206 obtains mode information from the operating system (e.g., a kernel, a module of the operating system, etc.), a driver component, a service component, and/or a management component resident on end device 160. By way of further example, mode and state detector 206 may communicate with the operating system, the driver component, etc. Additionally, or alternatively, mode and state detector 206 obtains mode information from information stored in a file generated by the operating system, the driver component, etc., and/or other types of files (e.g., user preference data, etc.). Additionally, or alternatively, mode and state detector 206 may obtain mode information using well-known and/or conventional means to obtain such information. End device 160 may be in a particular mode and may transition between modes. By way of further example, end device 160 may operate in an active mode or a working mode (e.g., fully usable), an airplane mode, a power-saving mode (e.g., a sleep mode, a hibernate mode, a quiescent mode, a stamina mode, etc.), an idle mode, a standby mode, and so forth. Additionally, mode and state detector 206 may also identify a cycle of end device 160. For example, the cycle may be a power-on or boot-up cycle, a power-off or shutdown cycle, a reboot cycle, and so forth. Mode and state detector 206 may store the mode information indicating the mode of end device 160 in a data structure or in another suitable form. The mode information may also include the cycle information. The mode information may be stored in non-volatile memory. Mode and state detector 206 may also store corresponding time information indicating the period of time end device 160 was in the particular mode (and cycle). Mode and state detector 206 obtains mode (and cycle) information of end device 160 when the throttling service is enabled (e.g., when end device 160 is powered on).

When an RRC Connection request is triggered at end device 160, establishment cause interpreter 202 determines whether the establishment cause associated with the request is set to particular value (e.g., delayTolerantAccess, moData, etc.). When establishment cause interpreter 202 determines that the establishment cause is not set to a particular value, end device 160 may proceed with an RRC Connection establishment procedure according to a 3GPP specification for LTE and any other specific requirements associated with the LTE service provider. When the establishment cause interpreter 202 determines that the establishment cause is set to a particular value, throttling manager 200 checks the value of the token bucket parameter. When the token bucket value is set to 0, the RRC Connection request is throttled. That is, the RRC Connection request is not transmitted. However, when the token bucket value is not set to 0, end device 160 transmits the RRC Connection request according to the RRC Connection establishment procedure and any other specific requirements associated with the LTE service provider.

According to an exemplary embodiment, throttling manager 200 maintains the value of the token bucket parameter across various states and modes of end device 160. Thus, according to an exemplary implementation, regardless of the state and/or mode of end device 160, parameter counter 204 increments the value of the token bucket parameter when a measure of time elapsing during the state and/or mode can be measured. According to such an implementation, throttling agent 165 may not include mode and state detector 206.

According to another exemplary implementation, parameter counter 204 increments the value of the token bucket parameter only when the interval of the RRC Connection Interval parameter lapses and end device 160 was in a particular mode and/or a particular state during the entire interval. Conversely, parameter counter 204 may not increment the value of the token bucket parameter when the interval of the RRC Connection Interval parameter lapses and end device 160 was not in a particular mode and/or particular state during the entire interval. That is, some states and/or modes may afford the value of the token bucket parameter to be incremented, while other states and/or modes may not afford the value of the token bucket parameter to be incremented. Parameter counter 204 and mode and state detector 206 cooperatively operate to determine whether to increment the value of the token bucket parameter based on the mode information and/or the state information and the interval.

According to yet other exemplary implementations, when transitions between states and/or modes occur during the interval of the RRC Connection Interval parameter, parameter counter 204 may or may not increment the value of the token bucket parameter. For example, end device 160 would receive time credit toward incrementing the value of the token bucket parameter for the period of time while in one particular mode and/or state, while not receiving time credit toward incrementing the value of the token bucket parameter while in another mode and/or state. Parameter counter 204 and mode and state detector 206 cooperatively operate to determine whether to increment the value of the token bucket parameter based on the mode information and/or the state information and the interval.

As previously described, according to an exemplary embodiment, when end device 160 is first powered on, throttling manager 200 initializes the value of the token bucket parameter. For example, the value of the token bucket parameter may be initialized to a value of 1. According to a use case in which an end device 160 attempts to inappropriately take advantage of the initialization process by purposely turning on and turning off in order to be awarded an RRC Connection request (i.e., by virtue of the value of 1), parameter counter 204 and mode and state detector 206 would prevent such behavior based on the mode information.

According to an exemplary embodiment, the throttling service that includes throttling RRC Connection requests is operatively performed on end device 160 on top of or in addition to network triggered RRC Connection throttling, such as Extended Access Barring and/or Extended Wait Time.

Figure 3:
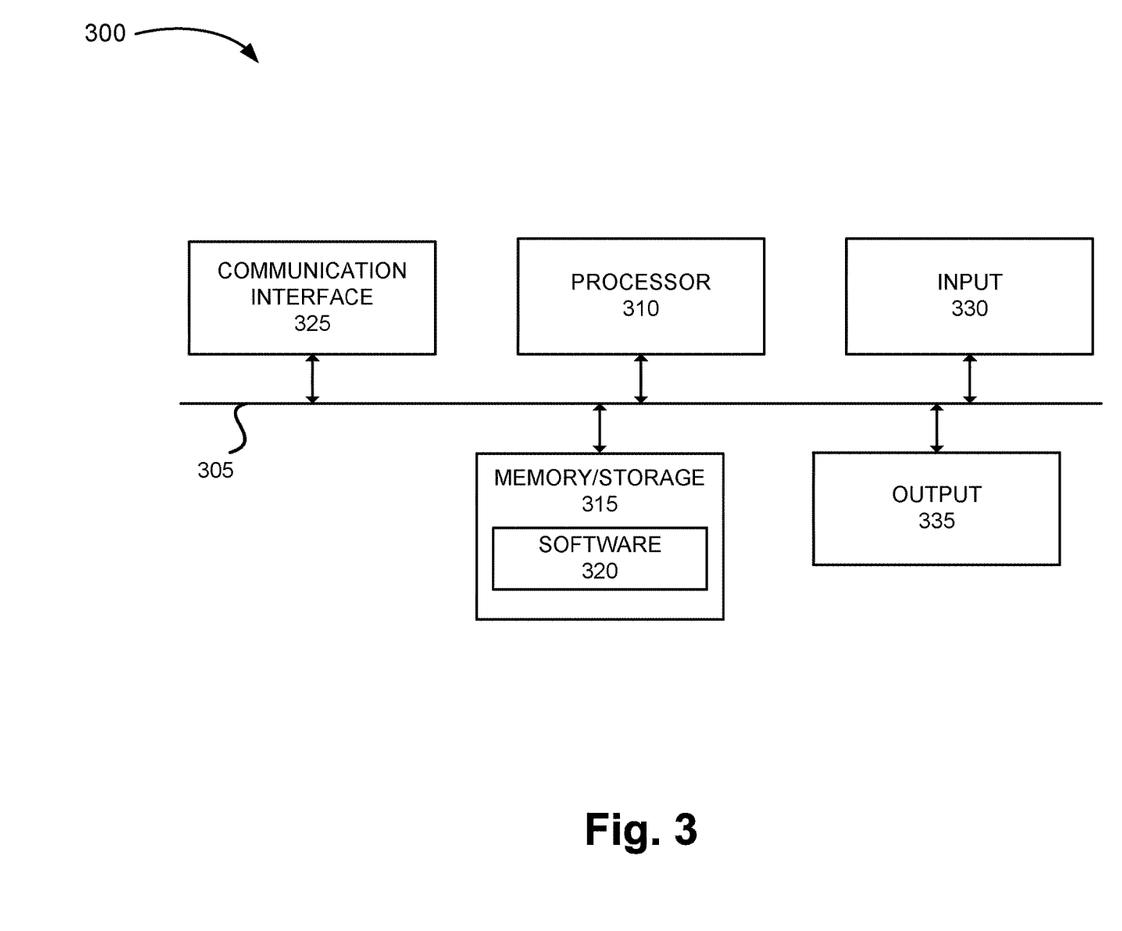
FIG. 3 is a diagram illustrating exemplary components of a device that may correspond to one or more of the devices illustrated in the exemplary environment of FIG. 1.

FIG. 3 is a diagram illustrating exemplary components of a device 300 that may correspond to one or more of the devices in environment 100. For example, device 300 may correspond to eNB 110, SGW 115, PGW 120, MME 125, HSS 130, end devices 160, as well as other devices illustrated and described. As illustrated in FIG. 3, according to an exemplary embodiment, device 300 includes a bus 305, a processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.) and a corresponding drive. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. As an example, with reference to end device 160, software 320 may include an application that, when executed by processor 310, provides the functions of the throttling service (e.g., throttling agent 165), as described herein.

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.).

Input 325 permits an input into device 300. For example, input 325 may include a keyboard, a mouse, a display, a button, a switch, an input port, speech recognition logic, a microphone, a camera, and/or some other type of visual, auditory, tactile, etc., input component. Output 330 permits an output from device 300. For example, output 330 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
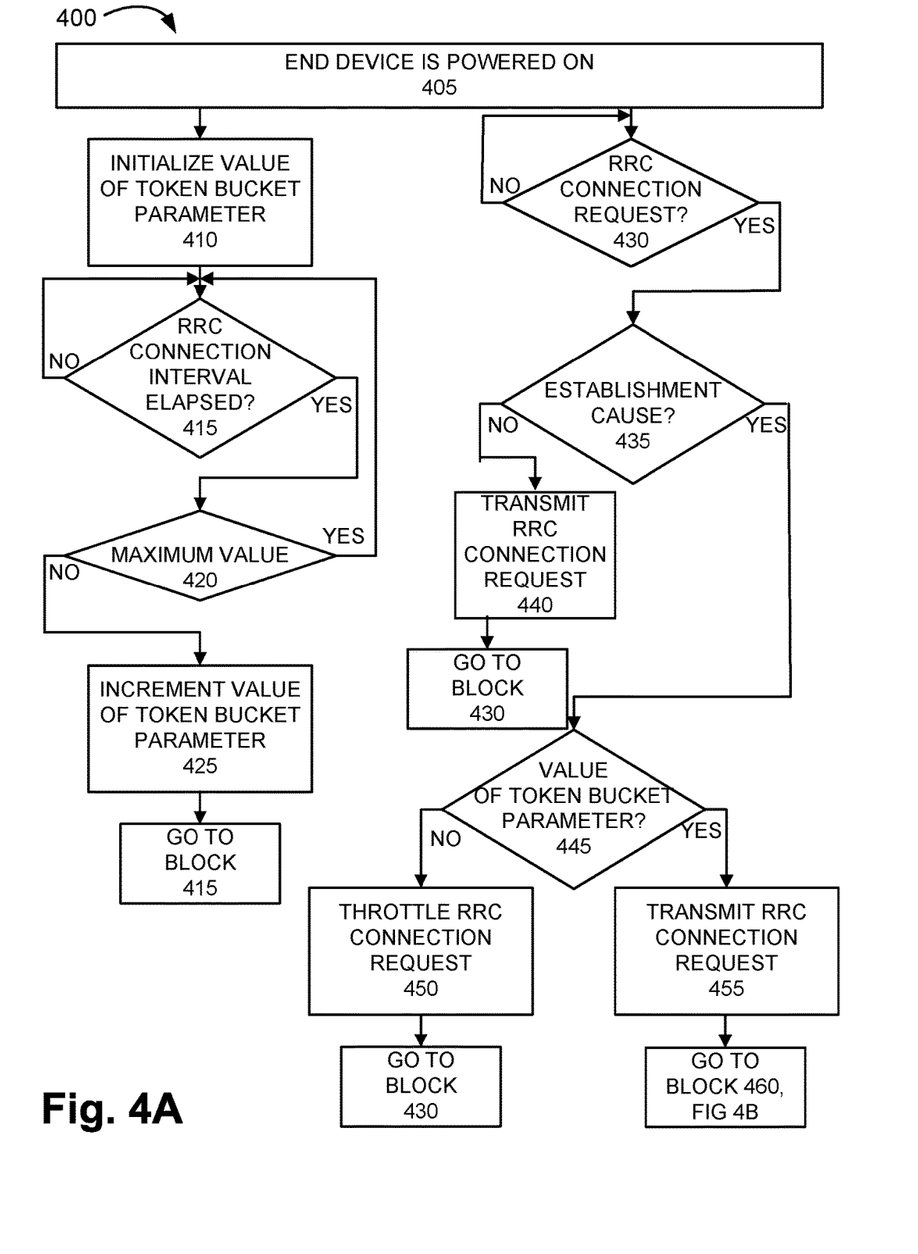
FIGS. 4A and 4B are flow diagrams that illustrate exemplary processes pertaining to the throttling service.
Figure 4B:
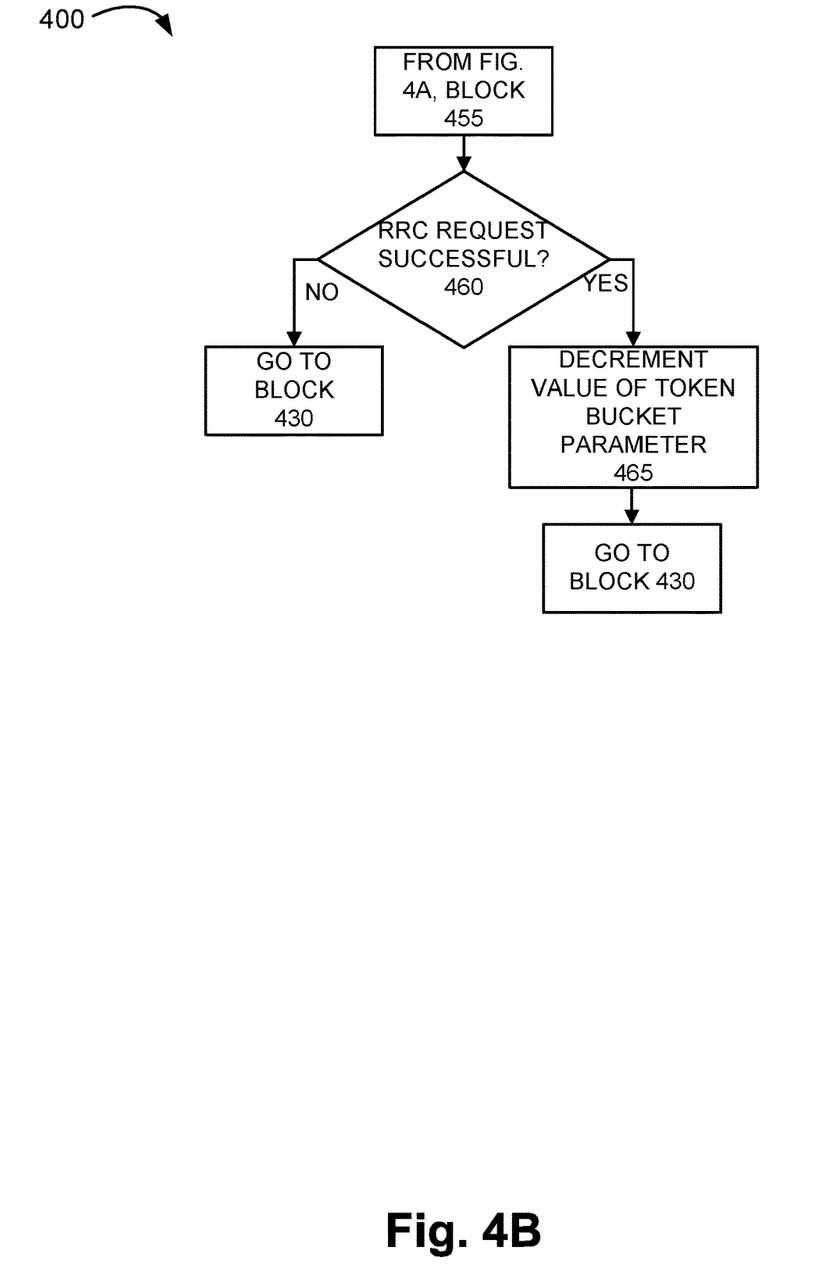

FIGS. 4A and 4B are flow diagrams illustrating an exemplary process 400 pertaining to the throttling service. Process 400 is directed to a process previously described above with respect to FIG. 2, as well as elsewhere in this description, in which a throttling service regulates the transmission of RRC Connection requests. According to an exemplary embodiment, end device 160, which includes throttling agent 165, performs steps of process 400. For example, processor 310 executes software 320 to perform the steps described.

For purposes of description and illustration of process 400, it is assumed that throttling agent 165 stores the necessary parameters. According to this example, throttling agent 165 uses parameters previously described to provide the throttling service. However, according to other examples, process 400 may use different parameters to provide the throttling service and regulate the transmission of RRC Connection requests by end device 160.

Referring to FIG. 4A, block 405, process 400 begins with end device 160 being powered on. For example, end device 160 may be powered on by a user or remotely via a wireless network (e.g., LTE network 105), and so forth.

Since process 400 includes logic flows that can be performed concurrently with respect to each other, blocks 410 through 425 of FIG. 4A illustrates one flow directed to the incrementing of the value of the token bucket parameter, and blocks 430 through 465 of FIGS. 4A and 4B illustrate another flow directed to RRC Connection requests.

In block 410, a value of the token bucket parameter is initialized. For example, throttling agent 165 initiates the value of the token bucket parameter to 1. By way of further example, block 410 is performed immediately subsequently to being powered on.

In block 415, it is determined whether an RRC Connection interval has elapsed. For example, throttling agent 165 monitors the amount of time elapsing from the instance when end device 160 is powered on. Throttling agent 165 determines whether the amount of time elapsed equals the amount of time indicated by the RRC Connection Interval parameter. For example, when the RRC Connection Interval parameter indicates a value of 1 RRC Connection request/30 minutes, throttling agent 165 determines whether the amount of time elapsed equals 30 minutes.

When it is determined that the RRC Connection interval has not elapsed (block 415—NO), process 400 waits and continues to block 415. For example, throttling agent 165 continues to monitor the elapsing of time. When it is determined that the RRC Connection interval has elapsed (block 415—YES), it is determined whether the value of the token bucket parameter has reached its maximum value (block 420). For example, throttling agent 165 may compare the current value of the token bucket parameter to a maximum value of the RRC Connection Burst parameter. When it is determined that the current value of the token bucket parameter does not exceed the maximum value of the RRC Connection Burst parameter (block 420—NO), throttling agent 165 increments the value of the token bucket parameter (block 425). For example, throttling agent 165 may increment the value of the token bucket parameter by 1. Process 400 continues back to block 415. When it is determined that the current value of the token bucket parameter is equal to the maximum value of the RRC Connection Burst parameter (block 420—YES), throttling agent 165 does not increment the value of the token bucket parameter and process 400 continues back to block 415.

In block 430, it is determined whether an RRC Connection request is received. For example, throttling agent 165 monitors whether an RRC Connection request is generated. By way of further example, an upper layer of an E-UTRAN protocol stack resident on end device 160 may generate an RRC Connection request, which is received by throttling agent 165. For example, the upper layer of the E-UTRAN protocol stack may determine whether an RRC Connection request is received immediately subsequent to the powering on of end device 160.

When it is determined that an RRC Connection request has not been generated or received by throttling agent 165 (block 430—NO), process 400 continues to wait at block 430. When it is determined that an RRC Connection request has been generated or received by throttling agent 165 (block 430—YES), it is determined whether the establishment cause of the RRC Connection request is a type subject to the throttling service. For example, throttling agent 165 may read the value of the establishment cause included in the RRC Connection request and compare that value to one or multiple establishment cause values stored by throttling agent 165, which indicate an establishment cause value subject to the throttling service. For example, throttling agent 165 may store a data structure (e.g., a table, a list, etc.) that stores establishment cause value(s) which are subject to the throttling service. Based on the comparison of the establishment cause value included in the RRC Connection request to the stored establishment cause value(s) subject to the throttling service, throttling agent 165 determines whether the RRC Connection request is subject to the throttling service.

When it is determined that the RRC Connection request is not subject to the throttling service (block 435—NO), the RRC Connection request is transmitted (block 440). For example, throttling agent 165 may pass the RRC Connection request toward a lower layer (e.g., a physical layer, a Medium Access Control (MAC) layer, etc.) and the RRC Connection request is transmitted by end device 160 to LTE network 105 (e.g., eNB 110). Process 400 may continue to block 430. When it is determined that the RRC Connection request is subject to the throttling service (block 440—YES), it is determined whether the value of the token bucket parameter permits the transmission of the RRC Connection request. For example, throttling agent 165 may determine whether the value of the token bucket parameter is 0. Throttling agent 165 may access a memory space and read the current value of the token bucket parameter.

When it is determined that the value of the token bucket parameter does not permit the transmission of the RRC Connection request (block 445—NO), the RRC Connection request is not transmitted (block 450). For example, throttling agent 165 suppresses the transmission of the RRC Connection request. Throttling agent 165 may inform the upper layer about the failure to establish an RRC connection and that the throttling of RRC Connection requests is enabled. The RRC Connection request may be deleted. Process 400 may continue to block 430.

When it is determined that the value of the token bucket parameter permits the transmission of the RRC Connection request (block 445—YES), the RRC Connection request is transmitted (block 455). For example, throttling agent 165 may pass the RRC Connection request to a lower layer of the protocol stack and the RRC Connection request is transmitted to LTE network 105 (e.g., eNB 110).

Referring to FIG. 4B, subsequent to transmission of the RRC Connection request of block 455, it is determined whether the RRC Connection request is successful (block 460). For example, throttling agent 165 determines whether the RRC Connection establishment is successful based on the receipt of a message or the absence of receipt of a message, as previously described.

When it is determined that the RRC Connection request was not successful (block 460—NO), process 400 continues to block 430. For example, throttling agent 165 may not receive any message from eNB 110, receive a reject message, etc. When it is determined that the RRC Connection request was successful (block 460—YES), the value of the token bucket parameter is decremented. For example, throttling agent 165 may receive an RRC Connection setup message, an approval message, etc. Additionally, in response to such a determination, throttling agent 165 decrements the value of the token bucket parameter and proceeds to block 430.

Although FIGS. 4A and 4B illustrate an exemplary process 400 of the throttling service, according to other embodiments, process 400 may include additional operations, fewer operations, and/or different operations than those illustrated in FIGS. 4A and 4B and described herein. For example, process 400 may include determining whether the state and/or the mode of end device 160 permits incrementing the value of the token bucket parameter at block 425. Additionally, as previously described, the throttling service may be provided in conjunction with other network-side throttling or access request management mechanisms, such as Extended Access Barring, etc. In this regard, the permission to transmit an RRC Connection request, via the throttling service, may be overridden by other mechanisms. According to other embodiments, block 410 may be performed before blocks 415 and 430. For example, blocks 415 to 425 and blocks 430 to 465 may be performed concurrently, but subsequent to block 410.

The foregoing description of embodiments provides illustration, but is not intended to be exhaustive or to limit the embodiments to the precise form disclosed. Accordingly, modifications to the embodiments described herein may be possible The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   storing, by an end device, parameters of a throttling service that governs transmissions of radio resource connection requests to a wireless network;
   generating, by the end device, a first radio resource connection request that includes an establishment cause;
   determining, by the end device, whether the establishment cause is subject to the throttling service;
   determining, by the end device, a value of a first parameter of the parameters in response to determining that the establishment cause is subject to the throttling service;
   omitting to transmit, by the end device, the first radio resource connection request in response to determining that the value of the first parameter is a first value; and
   transmitting, by the end device, the first radio resource connection request to the wireless network in response to determining that the value of the first parameter is a second value, wherein the first value and the second value are different.

2. The method of claim 1, wherein the parameters include a second parameter that indicates a number of radio resource connection requests that can be transmitted within a time interval, by the end device, according to the throttling service, and the method further comprising:
   monitoring, by the end device, transpiration of time based on the time interval; and
   incrementing, by the end device, the value of the first parameter for each time interval that elapses in which a radio resource connection request is not transmitted by the end device and each time interval that elapses in which a radio resource connection request is transmitted but is unsuccessful in establishing a radio resource connection with the wireless network.

3. The method of claim 2, further comprising:
   determining, by the end device, whether the first radio resource connection request is successful in establishing a radio resource connection with the wireless network;
   decrementing, by the end device, the value of the first parameter in response to determining that the first radio resource connection request is successful; and
   omitting, by the end device, to increment and to decrement the value of the first parameter in response to determining that the first radio resource connection request is unsuccessful.

4. The method of claim 2, wherein the parameters include a third parameter that indicates a maximum value for the first parameter, and the method further comprising:

determining, by the end device, subsequent to the transpiration of the time interval, whether the value of the first parameter is equal to the maximum value; and incrementing, by the end device, the value of the first value in response to determining that the value of the first parameter is less than the maximum value.

5. The method of claim 2, further comprising:

determining, by the end device, at least one of a state of the end device or a mode of the end device during the time interval; and determining, by the end device, whether to increment the value of the first parameter based on the least one of the state of the end device or the mode of the end device.

6. The method of claim 5, further comprising:

storing, by the end device, at least one of state information that indicates the state of the end device and corresponding time period or mode information that indicates the mode of the end device and corresponding time period; and using, by the end device, the at least one of the state information or the mode information to determine whether to increment the value of the first parameter.

7. The method of claim 1, wherein the parameters include one or more values that indicate one or more establishment causes that are subject to the throttling service.

8. The method of claim 1, further comprising:

transmitting, by the end device, the first radio resource connection request to the wireless network in response to determining that the establishment cause is not subject to the throttling service.

9. An end device comprising:

a communication interface;

a memory, wherein the memory stores instructions; and a processor, wherein the processor executes the instructions to:

store parameters of a throttling service that governs transmissions of radio resource connection requests to a wireless network;

generate a first radio resource connection request that includes an establishment cause;

determine whether the establishment cause is subject to the throttling service;

determine a value of a first parameter of the parameters in response to a determination that the establishment cause is subject to the throttling service;

omit to transmit the first radio resource connection request in response to a determination that the value of the first parameter is a first value; and transmit, via the communication interface, the first radio resource connection request to the wireless network in response to a determination that the value of the first parameter is a second value, wherein the first value and the second value are different.

10. The end device of claim 9, wherein the parameters include a second parameter that indicates a number of radio resource connection requests that can be transmitted within a time interval, by the end device, according to the throttling service, and the processor further executes the instructions to:

monitor transpiration of time based on the time interval; and increment the value of the first parameter for each time interval that elapses in which a radio resource connection request is not transmitted by the end device and each time interval that elapses in which a radio resource connection request is transmitted but is unsuccessful in establishing a radio resource connection with the wireless network.

11. The end device of claim 10, wherein the processor further executes the instructions to:

determine whether the first radio resource connection request is successful in establishing a radio resource connection with the wireless network;

decrement the value of the first parameter in response to a determination that the first radio resource connection request is successful; and omit to increment and to decrement the value of the first parameter in response to a determination that the first radio resource connection request is unsuccessful.

12. The end device of claim 10, wherein the parameters include a third parameter that indicates a maximum value for the first parameter, and wherein the processor further executes the instructions to:

determine subsequent to the transpiration of the time interval, whether the value of the first parameter is equal to the maximum value; and increment the value of the first value in response to a determination that the value of the first parameter is less than the maximum value.

13. The end device of claim 10, wherein the processor further executes the instructions to:

determine at least one of a state of the end device or a mode of the end device during the time interval; and determine whether to increment the value of the first parameter based on the least one of the state of the end device or the mode of the end device.

14. The end device of claim 9, wherein the parameters include one or more values that indicate one or more establishment causes that are subject to the throttling service, and wherein the processor further executes the instructions to:

transmit, via the communication interface, the first radio resource connection request to the wireless network in response to a determination that the establishment cause is not subject to the throttling service.

15. The end device of claim 9, wherein the end device is a machine-type device.

16. A non-transitory, computer-readable storage medium storing instructions executable by a processor of a computational device, which when executed cause the computational device to:

store parameters of a throttling service that governs transmissions of radio resource connection requests to a wireless network;

generate a first radio resource connection request that includes an establishment cause;

determine whether the establishment cause is subject to the throttling service;

determine a value of a first parameter of the parameters in response to a determination that the establishment cause is subject to the throttling service;

omit to transmit the first radio resource connection request in response to a determination that the value of the first parameter is a first value; and transmit the first radio resource connection request to the wireless network in response to a determination that the value of the first parameter is a second value, wherein the first value and the second value are different.

17. The non-transitory, computer-readable storage medium of claim 16, wherein the parameters include a second parameter that indicates a number of radio resource connection requests that can be transmitted within a time interval, by the end device, according to the throttling service, the storage medium further storing instructions to:
monitor transpiration of time based on the time interval; and
increment the value of the first parameter for each time interval that elapses in which a radio resource connection request is not transmitted by the computational device and each time interval that elapses in which a radio resource connection request is transmitted but is unsuccessful in establishing a radio resource connection with the wireless network.

18. The non-transitory, computer-readable storage medium of claim 17, further storing instructions to:
determine whether the first radio resource connection request is successful in establishing a radio resource connection with the wireless network;
decrement the value of the first parameter in response to a determination that the first radio resource connection request is successful; and
omit to increment and to decrement the value of the first parameter in response to a determination that the first radio resource connection request is unsuccessful.

19. The non-transitory, computer-readable storage medium of claim 16, wherein the parameters include a third parameter that indicates a maximum value for the first parameter, and the storage medium further storing instructions to:
determine subsequent to the transpiration of the time interval, whether the value of the first parameter is equal to the maximum value; and
increment the value of the first value in response to a determination that the value of the first parameter is less than the maximum value.

20. The non-transitory, computer-readable storage medium of claim 17, further storing instructions to:
determine at least one of a state of the computational device or a mode of the computational device during the time interval; and
determine whether to increment the value of the first parameter based on the least one of the state of the computational device or the mode of the computational device.

* * * * *